United States Patent [19]
Fuller

[11] Patent Number: 5,381,621
[45] Date of Patent: Jan. 17, 1995

[54] JOINTED SPINNER BAIT

[76] Inventor: James W. Fuller, 110 N. Prospect St. Apt. 2, Merrill, Wis. 54452

[21] Appl. No.: 149,516

[22] Filed: Nov. 9, 1993

[51] Int. Cl.⁶ .............................................. A01K 85/00
[52] U.S. Cl. .................... 43/42.13; 43/42.11
[58] Field of Search ................ 43/42.13, 42.11, 42.14, 43/42.15, 42.16, 42.17, 42.18, 42.19, 42.39, 42.2, 42.03, 42.33, 42.34, 42.35, 17.5, 17.6

[56] References Cited

U.S. PATENT DOCUMENTS

| | | | |
|---|---|---|---|
| 1,079,891 | 11/1913 | Simms | 43/17.6 |
| 1,817,694 | 4/1931 | Lafky | 43/17.6 |
| 3,224,133 | 12/1965 | Emard | 43/42.36 |
| 3,885,340 | 5/1975 | Volenec | 43/42.33 |
| 4,201,008 | 5/1980 | Sparkman | 43/42.13 |
| 4,625,448 | 12/1986 | Borders | 43/42.11 |
| 4,637,158 | 1/1987 | Reid | 43/42.14 |
| 4,718,191 | 1/1988 | Gentry | 43/42.13 |
| 4,750,290 | 6/1988 | Renaud | 43/42.11 |
| 5,084,996 | 2/1992 | Woodruff et al. | 43/42.33 |

Primary Examiner—P. Austin Bradley
Assistant Examiner—Chuck Y. Mah
Attorney, Agent, or Firm—Hugh E. Smith

[57] ABSTRACT

A jointed spinner bait which comprises a forward hook and lure portion and a trailing spinner portion; a removably connected rigid wire segment inserted directly ahead of and secured to said trailing spinner portion, said rigid wire segment having ends prebent into closable eye portions, the eye on one end of said segment being on one side of such wire segment while the eye on the other end thereof is on the opposite side of such wire segment, such closable eye portions being adapted to engage with and to be removable from an eye on said spinner portion and from an eye on said forward portion of such bait, said wire segment including vibration into said spinner bait as the spinner rotates. Modifications include providing an offset bend in the forward end of said wire section; adding a spiral vane along the longitudinal axis of said wire segment; and introducing a lighted spinner assembly into the jointed spinner bait.

3 Claims, 4 Drawing Sheets

JOINTED SPINNER BAIT

BACKGROUND OF THE INVENTION

1. Field of the Invention

The present invention relates to jointed spinner baits and more particularly pertains to such a bait which has enhanced vibrating motion.

2. Description of the Prior Art

The use of jointed spinner baits is known in the prior art. More specifically, such bait devices heretofore devised and utilized for the purpose of fishing are known to consist basically of familiar, expected and obvious structural configurations, notwithstanding the myriad of designs encompassed by the crowded prior art which have been developed for the fulfillment of countless objectives and requirements. Typical of such baits are those shown in U.S. Pat. Nos. 4,1447,980; 4,507,892; 4,930,247; 4,881,341; and 5,138,789.

In this respect, the bait according to the present invention substantially departs from the conventional concepts and designs of the prior art, and in so doing provides a bait design primarily developed for the purpose of enhancing vibration therein.

SUMMARY OF THE INVENTION

In view of the foregoing disadvantages inherent in the known types of jointed spinner baits now present in the prior art, the present invention provides an improved construction wherein the same can be utilized to provide greater vibration in the bait. As such, the general purpose of the present invention, which will be described subsequently in greater detail, is to provide a new and improved jointed spinner bait which has all the advantages of the prior art devices and none of the disadvantages.

To attain this, the present invention essential relates to a jointed spinner bait which comprises a forward hook and lure portion and a trailing spinner portion; a removably connected rigid wire segment inserted directly ahead of and secured to said trailing spinner portion, said rigid wire segment having ends prebent into closable eye portions, the eye on one end of said segment being on one side of such wire segment while the eve on the other end thereof is on the opposite side of such wire segment, such closable eye portions being adapted to engage with and to be removable from an eye on said spinner portion and from an eve on said forward portion of such bait, said wire segment inducing vibration into said spinner bait as the spinner rotates. Modifications include providing an offset bend in the forward end of said wire section; adding a spiral vane along the longitudinal axis of said wire segment; and introducing a lighted spinner assembly into the jointed spinner bait.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved jointed spinner bait which has all the advantages of the prior art devices and none of the disadvantages.

It is another object of the present invention to provide a new and improved jointed spinner bait which may be easily and efficiently manufactured and marketed.

It is a further object of the present invention to provide a new and improved jointed spinner bait which is of a durable and reliable construction.

An even further object of the present invention is to provide a new and improved jointed spinner bait which is susceptible of a low cost of manufacture with regard to both materials and labor, and which accordingly is then susceptible of low prices of sale to the consuming public, thereby making such baits economically available to the buying public.

Still another object of the present invention is to provide a new and improved jointed spinner bait having increased vibration motion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
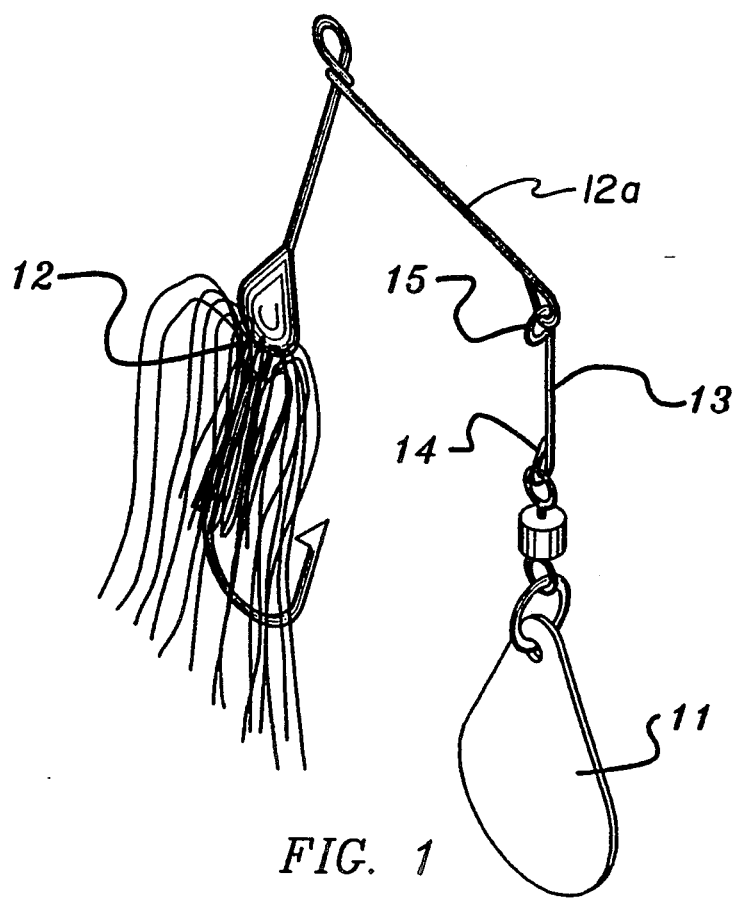
FIG. 1 is a perspective view of a jointed spinner bait according to the present invention.
Figure 2:
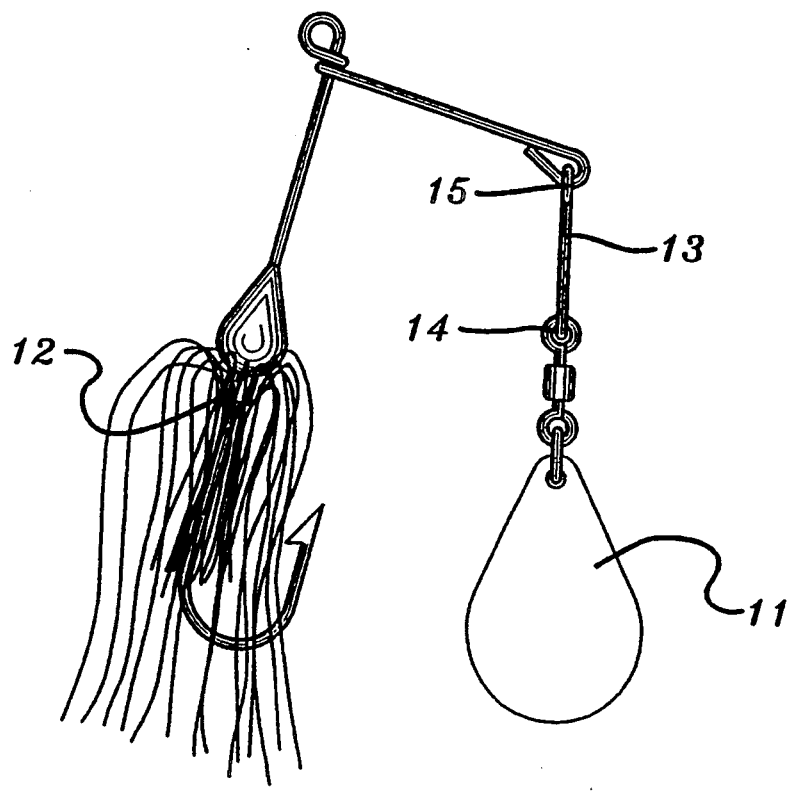
FIG. 2 is a front view of the device shown in FIG. 1.

With reference now to the drawings, and in particular to FIGS. 1 and 2 thereof, a new and improved jointed spinner device embodying the principles and concepts of the present invention and generally designated by the reference numeral 10 will be described.

More specifically, it will be noted that a conventional spinner bait having a spinner 11 and a streamer jig and hook 12 with a laterally extending arm 12a is fitted with a straight wire 13 inserted just ahead of spinner 11 and coupled to an outer distal end of the extending arm 12a. Wire 13 has closable eye loop 14 and 15 at each end thereof to removably engage with the spinner and the outer distal end of the laterally extending arm 12a. One of the closable loops 14 is formed at one side of wire 13 while the other loop 15 is formed at the opposite side of such wire 13. This inserted wire 13 exaggerates the vibration induced by rotation of spinner 11 and greatly increases the activity of the entire bait structure.

Figure 3:
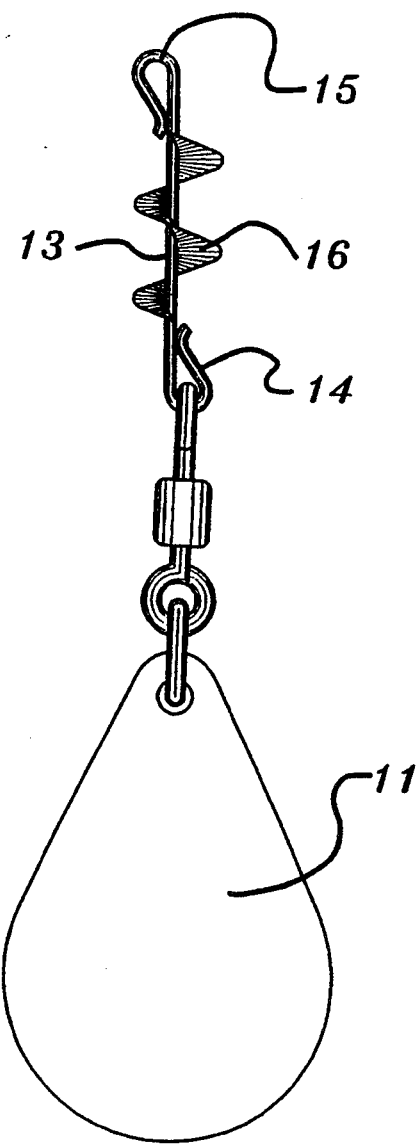
FIG. 3 is a front elevation of a modification of the present invention.

FIG. 3 illustrates the addition of a rotation vane 16 to wire 13. This will impart still further action to the bait. Such vane 16 is spiral in design and is anchored to wire 13 along the length axis thereof.

Figure 4:
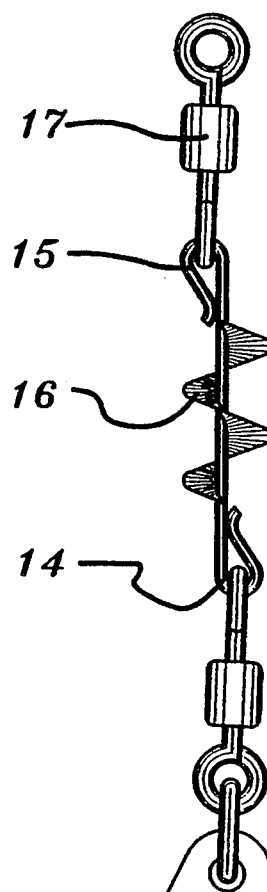
FIG. 4 is a front elevation of the device of FIG. 3 showing the addition of a forward swivel thereto.
Figure 4:
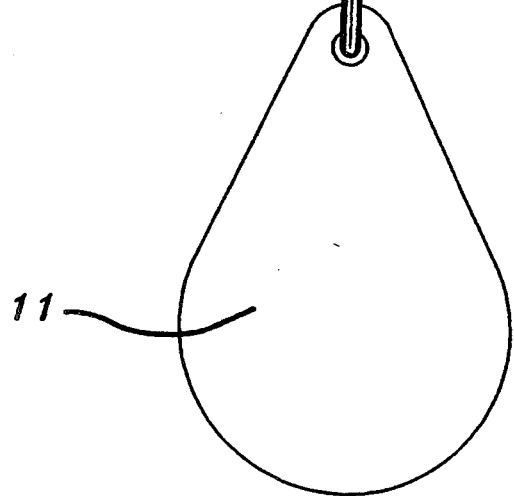

FIG. 4 duplicates FIG. 3 but includes the addition of a full swivel 17 to the forward end of wire 13.

Figure 5:
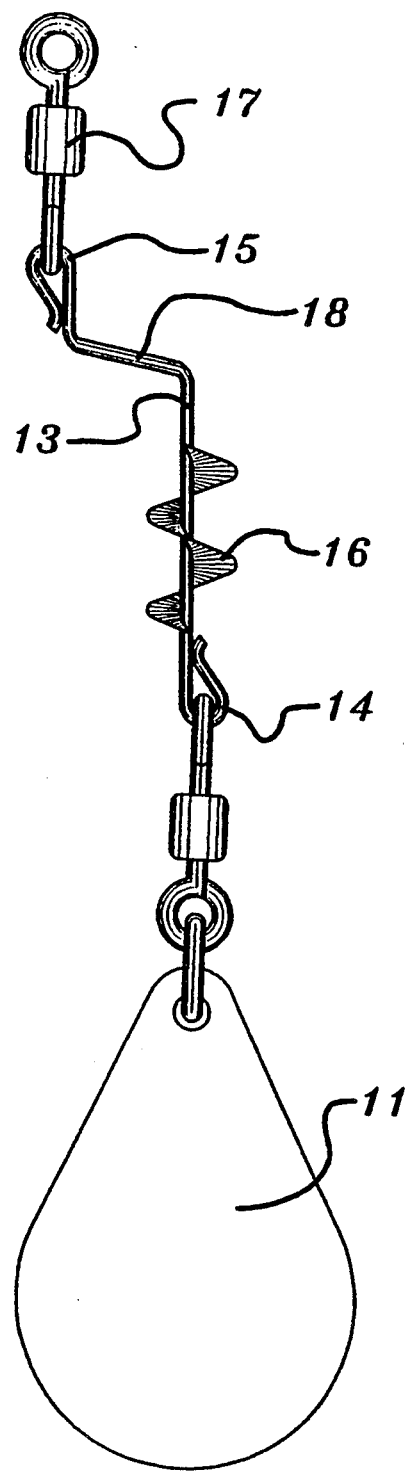
FIG. 5 is illustrates a front view of a modification of the device of FIG. 4 wherein an offset bend is introduced into the wire segment interposed ahead of the spinner.

FIG. 5 illustrates the device shown in FIG. 4 wherein an offset, essentially right angle bend 18 is introduced into the forward end of wire 13.

Figure 6:
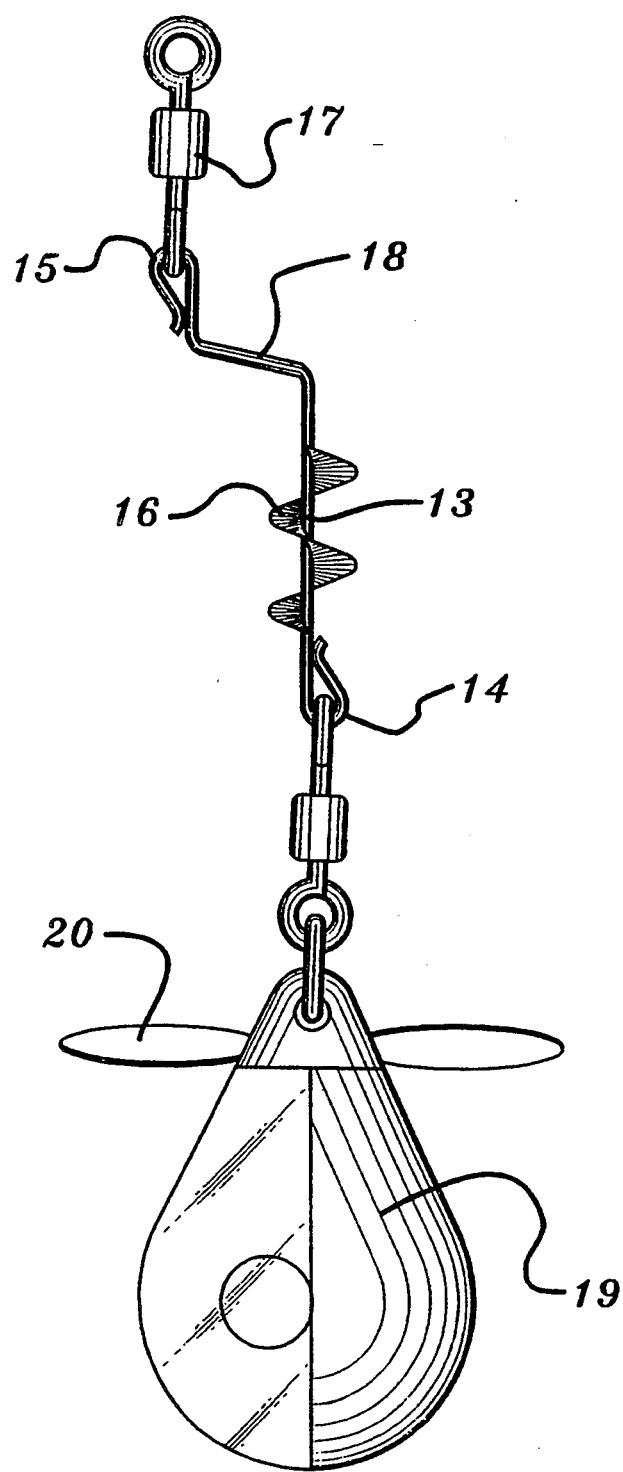
FIG. 6 is a front view showing a modified spinner arrangement.
Figure 7:
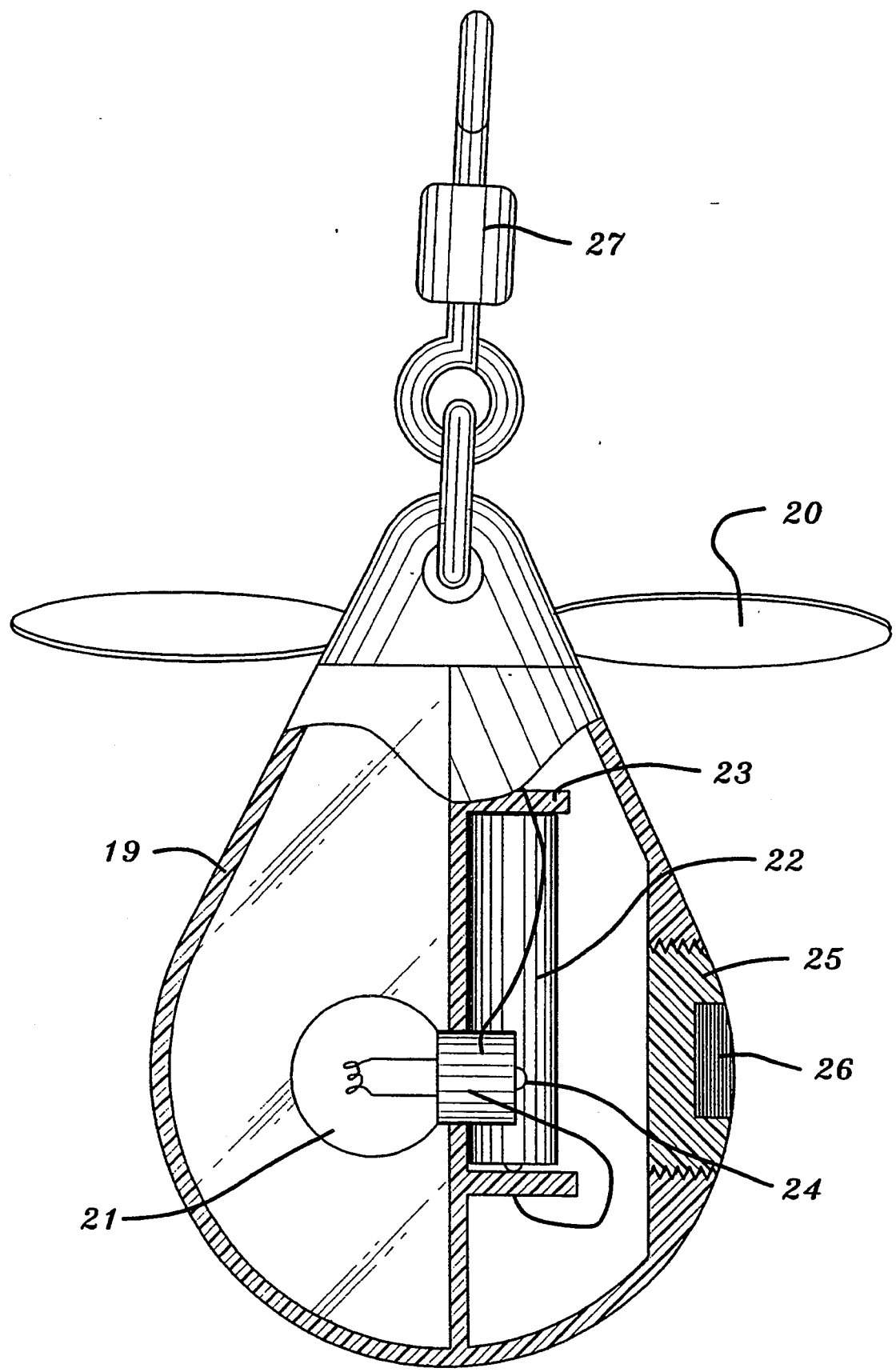
FIG. 7 is an enlarged detail front view in partial section of the spinner of FIG. 6.

FIG. 6 illustrates the replacement in the device of FIG. 5 of the conventional spinner 11 with a modified tear-drop shaped spinner 19 (more specifically shown in FIG. 7). Spinner 19 has, as an integral part thereof, a prop spinner 20 to provide additional agitation to attract fish thereto.

FIG. 7 is a detailed view in partial section of the spinner 19 shown in FIG. 6. Such spinner 19 is designed to be internally lighted as described below and, to permit the light to be visible and to reduce the weight thereof, is made of a clear plastic instead of the conventional metal of the spinners shown in preceding drawings. Because of its size, e.g. approximately 4 inches long, 2½ inches wide and an inch thick, the total weight of the spinner will approximate that of a smaller metal spinner despite the use of the lighter plastic in its construction. The spinner 19 is hollow and contains in its interior a small light bulb 21 and a battery 22 therefor mounted in a plastic holder 23. A small push-type, on-off switch 24 is mounted on the base of bulb 21 and is accessible through a water-tight threaded plug 25 in the side of spinner 19. A screw driver slot 26 permits rotation of plug 25 to remove or replace when turning the light on or off and when it is necessary to replace the bulb 21 or battery 22. Affixed to the forward end of spinner 19 is a conventional swivel 27 to which the wire 13 may be fastened as shown in FIG. 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new jointed spinner bait comprising:
    a streamer jig and hook having a laterally extending arm projecting at an oblique angle relative to said streamer jig and hook, said laterally extending arm having an outer distal end;
    a wire having a first eye loop and a second eye loop, with said wire being pivotally coupled to said outer distal end of said laterally extending arm at said first eye loop thereof;
    a first swivel having first and second ends with said first end of said swivel being pivotally coupled to said second eye loop of said wire; and,
    a spinner pivotally coupled to said second end of said first swivel, wherein said wire is pivotal relative to said laterally extending arm, said swivel is pivotal relative to said wire, and said spinner is pivotal relative to said swivel;
       wherein said wire has a length axis, and further comprising a rotation vane fixedly secured to said wire end extending along said length axis thereof;
       and further wherein said wire has an offset, substantially right angle bend in said wire between said vane and said first eye loop thereof.

2. The new jointed spinner bait as recited in claim 1, wherein said spinner comprises a tear-drop shaped spinner having a prop spinner fixedly secured thereto, with blades of said prop spinner extending laterally from diametrically opposed sides of said tear-drop spinner.

3. The new jointed spinner bait as recited in claim 2, wherein said tear-drop shaped spinner has an interior with a threaded aperture extending therethrough, and is comprised of a substantially translucent material, with said tear-drop shaped spinner further comprising a light bulb mounted within said interior of said tear-drop shaped spinner, with a plastic holder mounted within said interior for receiving a battery, an on-off switch mounted within said interior and electrically coupled to both said holder and said light bulb for selectively energizing said light bulb, and a water-tight threaded plug threadably engaged to said threaded aperture, wherein said plug is selectively removable to permit access into said interior of said tear-drop shaped spinner.

* * * * *